United States Patent
Aoyagi (10) Patent No.: US 7,907,841 B2
(45) Date of Patent: Mar. 15, 2011

(54) CAMERA, CAMERA SYSTEM AND LIGHT EMISSION CONTROLLING METHOD

(75) Inventor: Hidehiko Aoyagi, Yokohama (JP)

(73) Assignee: Nikon Corporation, Tokyo (JP)

( * ) Notice: Subject to any disclaimer, the term of this patent is extended or adjusted under 35 U.S.C. 154(b) by 143 days.

(21) Appl. No.: 12/155,640

(22) Filed: Jun. 6, 2008

(65) Prior Publication Data

US 2009/0136224 A1    May 28, 2009

(30) Foreign Application Priority Data

Jun. 8, 2007 (JP) ................................. 2007-153249
May 13, 2008 (JP) ................................. 2008-125930

(51) Int. Cl.
*G03B 7/00* (2006.01)
(52) U.S. Cl. ....................................... 396/225; 348/371
(58) Field of Classification Search .................. 396/157, 396/164, 225, 255, 176; 348/224.1, 371, 348/227.1
See application file for complete search history.

(56) References Cited

U.S. PATENT DOCUMENTS

| 5,392,068 A * | 2/1995 | Suzuki et al. | 348/227.1 |
| 7,646,974 B2 * | 1/2010 | Wernersson | 396/164 |

FOREIGN PATENT DOCUMENTS

| JP | A-2003-015179 | 1/2003 |
| JP | A-2005-173254 | 6/2005 |

* cited by examiner

*Primary Examiner* — Christopher E Mahoney
*Assistant Examiner* — Autumn Parker
(74) *Attorney, Agent, or Firm* — Oliff & Berridge, PLC (57) ABSTRACT

A camera includes: a light emission unit that emits illumination light; an amount of emitted light control unit that, during photography using the illumination light, controls the amount of illumination light to be emitted during photography based upon the amount of light reflected back from the photographic subject during a preliminary emission of light; and a color temperature control unit that controls the color temperature of the illumination light during the preliminary light emission, based upon color information for ambient light.

9 Claims, 4 Drawing Sheets

CAMERA, CAMERA SYSTEM AND LIGHT EMISSION CONTROLLING METHOD

INCORPORATION BY REFERENCE

The disclosures of the following priority applications are herein incorporated by reference: Japanese Patent Application No. 2008-125930 filed May 13, 2008, and Japanese Patent Application No. 2007-153249 filed Jun. 8, 2007.

BACKGROUND OF THE INVENTION

1. Field of the Invention

The present invention relates to a camera, a camera system, and a light emission controlling method.

2. Description of Related Art

A camera system disclosed in Japanese Laid-Open Patent Publication 2005-173254 is known. With this camera system, during photography using an illumination device, the amount of light during the main light emission is determined based upon the amount of light reflected from the photographic subject during a preliminary light emission before the main light emission. Furthermore, a digital still camera disclosed in Japanese Laid-Open Patent Publication 2003-15179 is known. With this digital still camera, the color temperature of the illumination light emitted by the illumination device is controlled according to the color temperature of external light.

SUMMARY OF THE INVENTION

Generally, the optical reflectivity of a photographic subject and the light reception sensitivity of a sensor that detects the amount of light reflected back from the photographic subject both depend upon the wavelength of the light. Due to this, if the color temperature of the light during preliminary light emission is inappropriate, it is difficult to obtain correctly the amount of light to be emitted during the main light emission based upon the amount of light reflected back from the photographic subject during the preliminary light emission. The fact that the light emitting efficiency for the preliminary light emission depends greatly upon the color temperature of the light of the preliminary light emission, also exerts an influence upon correctly obtaining the amount of light to be emitted during the main light emission.

The present invention solves the problem described above in the following manner.

According to the first aspect of the present invention, a camera comprises: a light emission unit that emits illumination light; an amount of emitted light control unit that, during photography using the illumination light, controls the amount of illumination light to be emitted during photography based upon the amount of light reflected back from the photographic subject during a preliminary emission of light; and a color temperature control unit that controls the color temperature of the illumination light during the preliminary light emission, based upon color information for ambient light.

According to the second aspect of the present invention, in the camera according to the first aspect, it is preferred that the color temperature control unit further controls the color temperature of the illumination light during photography so as to match the color temperature of the illumination light during the preliminary light emission.

According to the third aspect of the present invention, in the camera according to the first aspect, it is preferred that, during a mode in which the color temperature of the illumination light is set manually, the color temperature control unit controls the color temperature of the illumination light during the preliminary light emission so as to match a manually set color temperature.

According to the fourth aspect of the present invention, a camera system comprises: an illumination device comprising a light emission unit that emits illumination light, and a color temperature control unit that controls the color temperature of the illumination light; and a camera comprising: a first calculation unit that, during photography using the illumination light, calculates an amount of illumination light to be emitted during photography based upon the amount of light reflected back from the photographic subject during a preliminary emission of light; a second calculation unit that calculates the color temperature of the illumination light during the preliminary light emission, based upon color information for the ambient light; and a transmission unit that transmits the results of calculation by the first calculation unit and the second calculation unit to the illumination device.

According to the fifth aspect of the present invention, in the camera system according to the fourth aspect, it is preferred that the illumination device controls the color temperature of the illumination light during the preliminary light emission, so as to match the color temperature transmitted from the camera.

According to the sixth aspect of the present invention, in the camera system according to the fifth aspect, it is preferred that the illumination device controls the color temperature of the illumination light during photography so as to match the color temperature of the illumination light during the preliminary light emission.

According to the seventh aspect of the present invention, in the camera system according to the fourth aspect, it is preferred that during a mode in which the color temperature of the illumination light is set manually, the color temperature control unit controls the color temperature of the illumination light during the preliminary light emission so as to match a manually set color temperature.

According to the eighth aspect of the present invention, a controlling method for light emission during photography using illumination light emitted by a light emission unit comprises controlling the color temperature of illumination light during a preliminary emission of light based upon color information for ambient light; and controlling the amount of illumination light emitted during photography based upon the amount of light reflected back from the photographic subject during the preliminary light emission.

DESCRIPTION OF THE PREFERRED EMBODIMENTS

Figure 1:
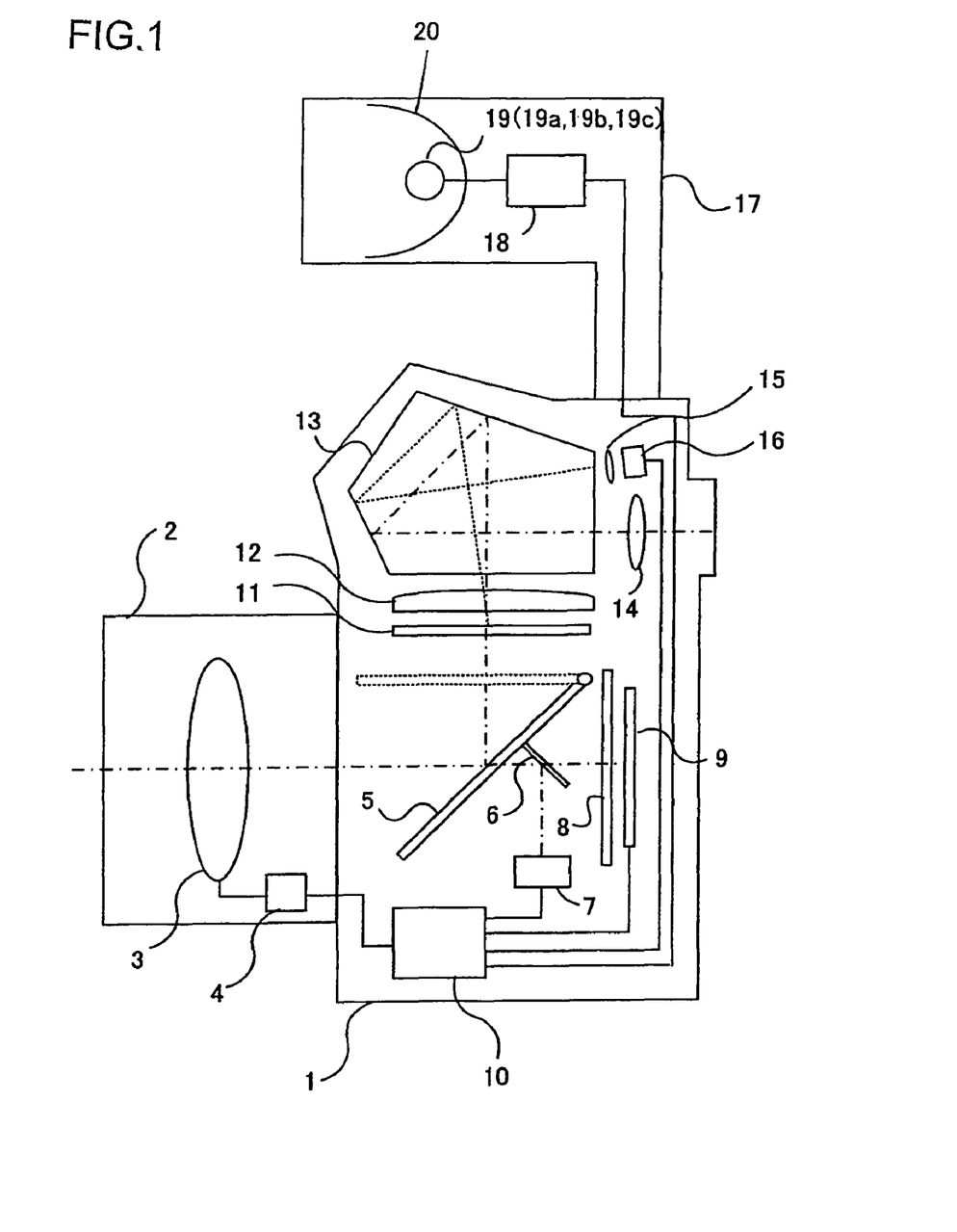
FIG. 1 is a figure for explanation of a single lens reflex camera system according to an embodiment of the present invention.

Preferred embodiments for implementation of the present invention will now be explained with reference to the drawings. FIG. 1 is a figure for explanation of the main structure of a single lens reflex camera system according to an embodiment of the present invention. In FIG. 1, a detachable illumination device 17 and an interchangeable lens 2 are installed to a camera main body 1. The illumination device 17 may be, for example, an electronic flash unit.

Light from a photographic subject that is incident upon the interchangeable lens 2 is incident into the camera main body 1 via a lens group 3 and an aperture not shown in the figures. This light from the photographic subject that is incident into the camera main body 1 is conducted upwards to a viewfinder unit by a quick return mirror 5 (hereinafter termed the "main mirror") that, before shutter release, is positioned as shown by the solid lines, and is imaged upon a diffusing screen 11. And a portion of this light from the photographic subject that is incident into the camera main body 1 is reflected downwards by a sub-mirror 6 and is also incident upon a focus detection unit 7. The focus detection unit 7 includes an AF sensor that operates according to a known phase difference detection method, and thereby the focus adjustment state of the interchangeable lens 2 is detected.

The light from the photographic subject that has been imaged upon the diffusing screen 11 is incident upon a pentaprism 13 via a condenser lens 12. On the one hand the pentaprism 13 conducts the light incident from the photographic subject to an eyepiece lens 14, while also conducting a portion thereof to an image re-forming lens 15. The image re-forming lens 15 images an image of the photographic subject upon a photometric sensor 16. And the photometric sensor 16 outputs image data for photometric processing corresponding to the brightness of the photographic subject image. This photometric sensor 16 may, for example, be a CCD image sensor that receives the incident light via a color filter. From the image data outputted by the photometric sensor 16, it is also possible to acquire, not only luminance information, but also color information about the ambient light.

After shutter release, the main mirror 5 is rotated towards the position shown by the broken lines, and the light from the photographic subject is conducted via a focal plane shutter 8 to an image sensor 9, and creates an image of the photographic subject upon its image-capturing surface. The image sensor 9 may be, for example, a CCD image sensor that has a plurality of photoelectric converters corresponding to pixels. This image capture sensor 9 captures the image of the photographic subject imaged upon its image-capturing surface, and outputs image data for photography corresponding to the brightness of the photographic subject image. After undergoing predetermined image processing by a image generation unit 109 that will be described hereinafter (refer to FIG. 2), this image data is recorded upon a recording medium by a recording unit 110 that will be described hereinafter (refer to FIG. 2).

A microcomputer 10 performs predetermined exposure calculation using the image data from the photometric sensor 16. When a release button not shown in the figures is actuated, this microcomputer 10 controls the focal plane shutter 8 and the aperture (not shown in the figures) provided within the interchangeable lens 2 based upon the results of exposure calculation, and also controls the image capture operation by the image sensor 9. Furthermore, the microcomputer 10 includes a circuit for performing communication with the illumination device 17. Based upon the color information for the ambient light acquired from the image data outputted by the photometric sensor 16, the microcomputer 10 determines the color temperature of the illumination light that is required, and transmits to the illumination device 17 an emitted light color control signal so as to emit illumination light of the color temperature thus determined.

In this embodiment, the emitted light color control signal is transmitted from the side of the camera main body 1 to the side of the illumination device 17. However, it would also be acceptable to arrange for an illumination control circuit 18 within the illumination device 17 to determine the color temperature of the illumination light, after receiving color temperature information for the ambient light from the side of the camera main body 1.

The microcomputer 10 sends a control signal to the lens drive motor 4 according to the focus adjustment state detected by the focus detection unit 7, and shifts a focusing lens included in the lens group 3 backwards and forwards along the direction of the optical axis. The direction of rotation of the lens drive motor 4 and its rotation amount (the shift direction and the shift amount of the focusing lens) are determined based upon a control signal from the focus detection unit 7. Due to this, focus adjustment upon the main photographic subject is automatically performed (autofocusing).

A light emission unit 19 of the illumination device 17 may, for example, consist of a red color LED 19a, a green color LED 19b, and a blue color LED 19c. The illumination control circuit 18 supplies electrical current to each of the LEDs 19a, 19b, and 19c according to the light emission control signal transmitted from the camera main body 1, so that each of these LEDs is caused to emit light. The light emission control signal includes an emitted light color control signal that instructs the light emission intensity ratio among the LEDs 19a, 19b, and 19c (in other words the color temperature of the illumination light from the illumination device 17), and an amount of emitted light control signal that instructs the amount of light to be emitted by the LEDs 19a, 19b, and 19c. The amounts of light emitted by the LEDs 19a, 19b, and 19c are changed according to increase or decrease of the electrical currents supplied to each of the LEDs. And the light emission intensity ratio among the LEDs 19a, 19b, and 19c varies according to change of the ratios of the electrical currents supplied to each of the LEDs. In FIG. 1, the light from the light emission unit 19 is emitted in the leftward direction from an aperture in a reflection plate 20 that is provided so as to surround the light emission unit 19.

Figure 2:
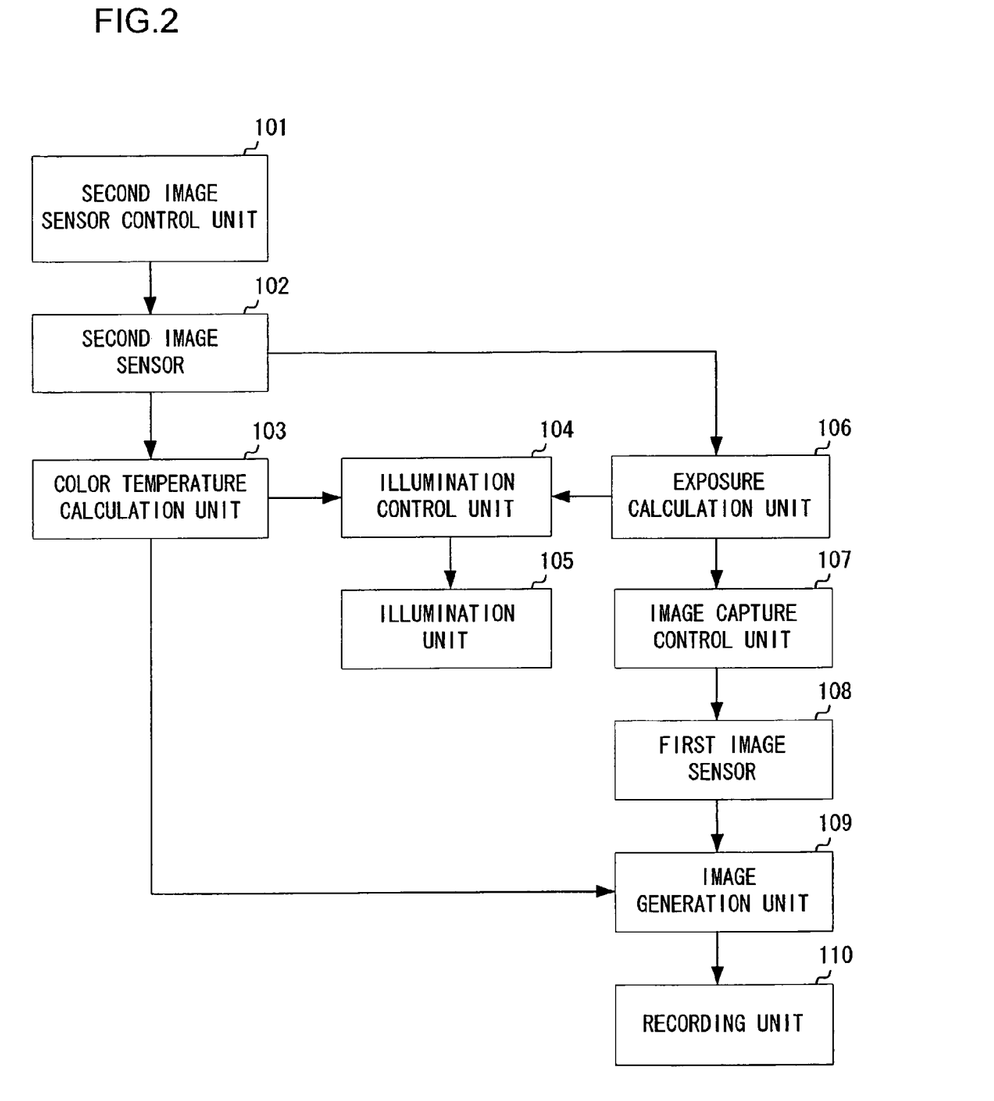
FIG. 2 is a functional block diagram of this camera system.

FIG. 2 is a functional block diagram of the camera system described above. In FIG. 2, a second image sensor 102 corresponds to the photometric sensor 16 (refer to FIG. 1) And a first image sensor 108 corresponds to the image sensor 9 (refer to FIG. 1). Moreover, an illumination unit 105 corresponds to the illumination device 17 (refer to FIG. 1). A second image sensor control unit 101, a color temperature calculation unit 103, an illumination control unit 104, an exposure calculation unit 106, an image capture control unit 107, and a image generation unit 109 are all included within the microcomputer 10 (refer to FIG. 1). And a recording unit 110 is not shown in FIG. 1.

The distinguishing feature of the camera system of this embodiment is that, before photography, it performs preliminary light emission by causing the illumination device 17 to emit a small amount of light. And the camera system determines the amount of emitted light that is required for the main light emission during photography, based upon the amount of light reflected from the photographic subject during the preliminary light emission.

The sequence of photographic processing performed by the microcomputer 10 will now be explained with reference to the flow chart of FIG. 3. When a half press actuation signal is inputted, which indicates that the release button not shown in the figures has been actuated to be half pressed, the micro computer 10 starts a program that performs the processing sequence shown in FIG. 3. When this program starts, autofocusing (not shown in the figure) is performed based upon the output detected by the focus detection unit 7.

Figure 3:
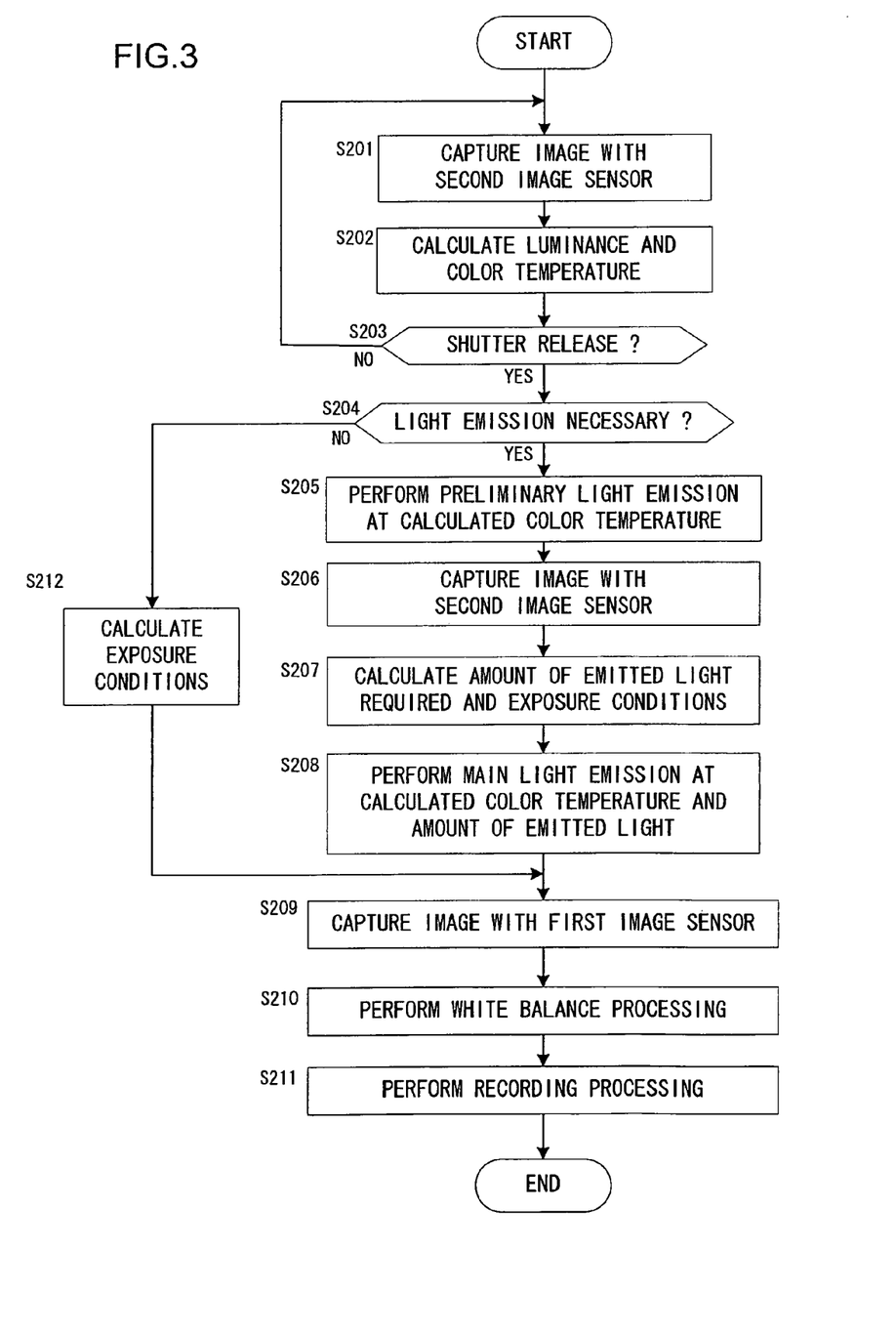
FIG. 3 is a flow chart for explanation of a processing sequence for photography, performed by a microcomputer.

In a step S201 of FIG. 3, a second image sensor control unit 101 provided in the microcomputer 10 causes the second image sensor 102 to capture an image of the photographic subject and to output image data. In a step S202, the color temperature calculation unit 103 provided in the microcomputer 10 calculates color temperature information for the ambient light based upon the image data outputted by the second image sensor 102. And the exposure calculation unit 106 provided in the microcomputer 10 calculates luminance information for the photographic subject image based upon this image data.

In a step S203, the microcomputer 10 makes a decision as to whether or not a full press actuation signal, which indicates that the release button not shown in the figures has been actuated to be full pressed, has been inputted. If an affirmative decision is reached in this step S203, then the flow of control proceeds to a step S204. Full press actuation is a mode of actuation in which the release button is pressed downwards more deeply than during half press actuation. On the other hand, if a negative decision is reached in the step S203, then the flow of control repeats the steps S201 through S203.

In the step S204, an affirmative decision is reached by the exposure calculation unit 106 included in the microcomputer 10 as to whether or not light emission by the illumination unit 105 should be performed, if main light emission by the illumination unit 105 is permitted, and if moreover, based upon the luminance information calculated in the step S202, it is decided that main light emission is necessary, then. If main light emission by the illumination unit 105 is prohibited, or if although main light emission by the illumination unit 105 is permitted, based upon the luminance information calculated in the step S202, it has been decided that such main light emission is not necessary, then a negative decision is reached as to whether or not light emission by the illumination unit 105 should be performed.

In a step S205, based upon the color temperature information calculated in the step S202, the illumination control unit 104 included in the microcomputer 10 controls the illumination unit 105 to perform a preliminary light emission of a smaller amount of emitted light than during the main light emission, at a color temperature that is approximately the same as the color temperature of the ambient light.

And, in a step S206, the second image sensor control unit 101 included in the microcomputer 10 causes the second image sensor 102 to capture an image of the photographic subject during this preliminary light emission, and to output image data. Then in a step S207, based upon this image data, the exposure calculation unit 106 included in the microcomputer 10 calculates luminance information for the image of the photographic subject during the preliminary light emission. The amount of light reflected during the preliminary light emission is calculated by subtracting, from the luminance information of the photographic subject image during this preliminary light emission, the luminance information calculated in the step S202 directly before actuation of the release button. Based upon this calculated amount of light of the preliminary light emission that is reflected, the amount of light required for photography to be emitted during the main light emission by the illumination unit 105 is calculated. Moreover, the exposure conditions during photography are calculated based upon this amount of reflected light during preliminary light emission. In concrete terms, an exposure time, an aperture, and an ISO speed are determined so that an appropriate exposure is obtained.

In a step S208, the illumination control unit 104 included in the microcomputer 10 controls the illumination unit 105 so as to execute, in a step S209, main light emission with the amount of emitted light that has been calculated during the above described preliminary light emission, at a color temperature that is approximately the same as the above described color temperature information during the preliminary light emission. In the color temperature being the same is included, not only the case of the color temperatures agreeing perfectly with one another, but also the case when the color temperatures are slightly different. Provided that the difference between the color temperature during the preliminary light emission and the color temperature during the main light emission remains such as to keep the error occurring in the amount of emitted light calculated in the step S207 described above within a predetermined value, this difference between the color temperatures is permitted.

In the step S209, the image capture control unit 107 included in the microcomputer 10 issues an instruction to rotate the main mirror 5, and causes the first image sensor 108 to capture an image of the photographic subject with the exposure conditions during photography, and to output the resulting image data. And, in a step S210, the image generation unit 109 included in the microcomputer 10 performs white balance processing upon the image data outputted by the first image sensor 108, based upon the color temperature information calculated in the step S202.

In a step S211, the microcomputer 10 issues an instruction to the recording unit 110 (refer to FIG. 2), and causes the image data after white balance processing to be recorded upon the recording medium. When the step S211 has been completed, the sequence of processing shown in FIG. 3 terminates.

If a negative decision is reached in the step S204 described above as to whether emission of light by the illumination unit 105 is required or not, then in a step S212 the exposure calculation unit 106 included in the microcomputer 10 calculates the exposure conditions during photography based upon the luminance information that was calculated in the step S202 directly before actuation of the release button. In concrete terms, it determines an exposure time, an aperture, and an ISO speed so as to obtain an appropriate exposure. In this case, photography is performed in the step S209 without causing the illumination unit 105 to emit light.

According to the embodiment explained above, in addition to obtaining the amount of emitted light for the main light emission in an appropriate manner based upon the amount of light reflected from the photographic subject during the preliminary light emission, the following beneficial operational effects are obtained.

(1) In photography that uses illumination light from the illumination device 17 as auxiliary light for the ambient light, when causing the illumination device 17 to perform preliminary light emission in order to determined the amount of emitted light that is required for the main light emission during photography, it is arranged to control the color temperature of the light for the preliminary light emission using the color temperature information for the ambient light. Due to this, if the color temperature of the light during the preliminary light emission is close to the color temperature of the ambient light, then it is possible to determine the amount of emitted light in the main light emission in a more appropriate manner, as compared to the case in which the color temperature of the light in the preliminary light emission is not controlled.

(2) Since the color temperature of the light in the main light emission is controlled so as to be approximately equal to the color temperature of the light in the preliminary light emission, accordingly it is possible to reduce the concern that an excessive amount of light or an insufficient amount of light will be present in the image that has been photographed, as compared to the case in which the color temperatures of the light in the main light emission and the light in the preliminary light emission are different from one another.

(Variations)

(1) Although, in the above explanation, an example was explained of an illumination device 17 of a type that is installed to an accessory shoe of the camera main body 1, it would also be acceptable to house the illumination unit, that includes the light emission unit 19 and the illumination control circuit 8, within the camera main body 1.

(2) As the camera main body 1, an example was explained of an electronic camera that performed image capture with a first image sensor 108 (the image sensor 9). Instead of this, for example, the present invention could also be applied to a silver halide camera that performs image capture with a photosensitive member such as a film. In the case of a silver halide camera, the steps S210 and S211 shown in FIG. 3 are not required.

(3) The present invention could also be applied to an electronic camera that is not a single lens reflex camera, or to a camera of which the photographic lens is not exchangeable (i.e. a lens fixed camera).

The present invention may also be applied to a camera that uses the image sensor 9 for photography as a photometric sensor. In other words, the luminance information and the color temperature information of the image of the photographic subject are calculated based upon the image data outputted by the image sensor 9 (in the steps S202 and S207). In particular, when the camera main body 1 is set to a live image display mode in which the image data outputted by the image sensor 9 is displayed in real time upon a display unit (for example an LCD) not shown in the figures that is provided upon the rear surface of the camera main body 1 (i.e. on the right side of the camera main body 1 shown in FIG. 1), it is desirable to calculate the color temperature information based upon the image data outputted by the image capture sensor 9 during this live image display. If this is done, then, since the sensor that outputs the image data for calculation of the color temperature information, and the sensor that is used for the actual image capture, are the same, accordingly there is the advantageous aspect that it becomes unnecessary to give any consideration to the influence of discrepancies between the light receiving sensitivities of the photometric sensor 16 and the image sensor 9.

Figure 4A:
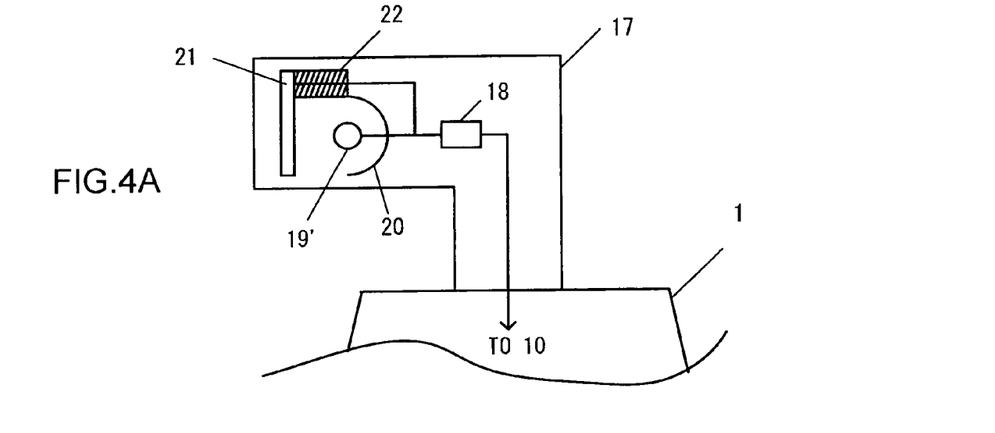
FIG. 4A is a structural diagram for explanation of another embodiment of the present invention.
Figure 4B:
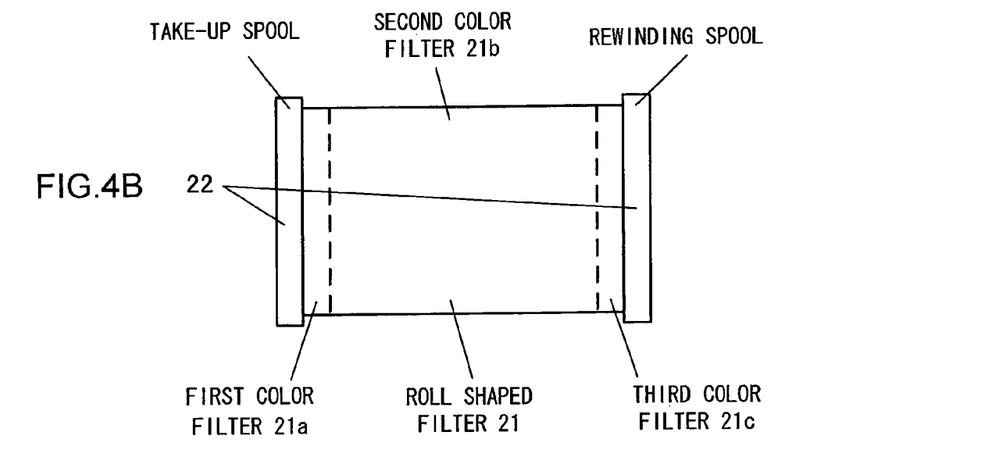
FIG. 4B is a figure showing the structure of a color filter.
Figure 4C:
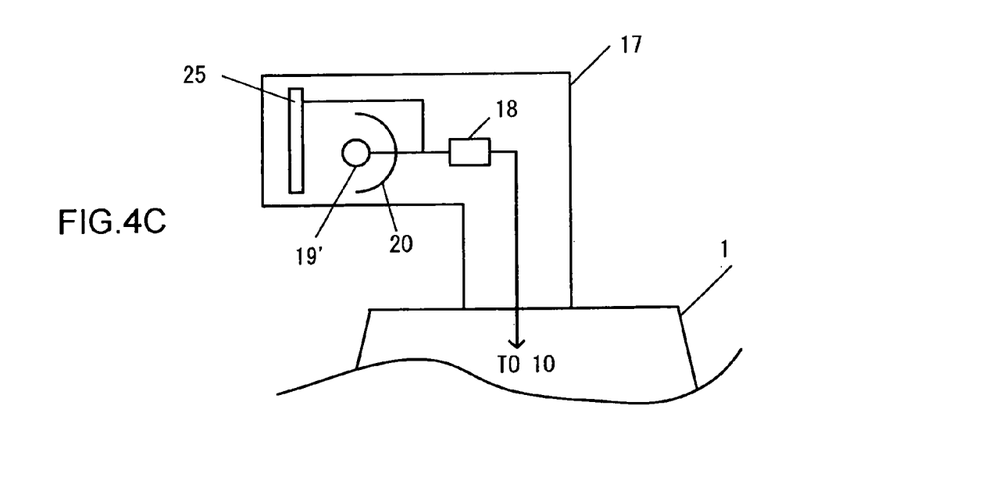
FIG. 4C is a figure showing a structure that controls the color of a variable color filter electrically.

(4) Although, in the embodiment described above, it was arranged to employ the LEDs 19*a*, 19*b*, and 19*c* as the light emission unit 19 of the illumination device 17, it would also be acceptable to arrange to employ some other light source. For example, it would also be acceptable to arrange to employ a type of xenon tube that is well known from the prior art as a light emission unit 19'. In this case, for the illumination device 17, it is desirable to employ a structure like the one shown by way of example in FIGS. 4A, 4B, and 4C. In the following, FIGS. 4A, 4B, and 4C will be explained. To members that are The same as in FIG. 1 the same reference symbols will be appended, and explanation thereof will be curtailed. The features by which FIG. 4A differs from FIG. 1, are that the light emission unit 19' is a xenon tube, and that, in front of this light emission unit 19', there are provided a color filter 21 and a drive mechanism 22 for driving this color filter to change it over. Based upon the color temperature information that has been calculated based upon the output of the photometric sensor 16 or the image sensor 9, the illumination control circuit 18 drives the drive mechanism 22, and changes over the color filter 21 that is positioned in front of the light emission unit 19'. The color filter 21 is a filter in which color filters 21*a*, 21*b*, and 21*b* for a plurality of colors are formed together in the shape of a roll (refer to FIG. 4B), and it is arranged for the color filter that is disposed in front of the light emission unit 19' to be selectively changed over by a construction similar to that of the spool that winds up the film of a film camera (a double construction for winding up and rewinding). Or, as shown in FIG. 4C, it would also be acceptable to provide, in front of the light emission unit 19', a variable color filter (for example a liquid crystal panel) 25 whose color can be varied electrically, and to control this variable color filter 25 electrically.

(5) Although, in the embodiment described above, as a method of controlling the color temperature of the light that is emitted from the illumination device, the light emission intensities ratio among the red color LED, the blue color LED, and the green color LED were each varied by changing the ratio of the electrical currents supplied to these LEDs, it would also be acceptable to employ some other method. For example, in the case of photography that employs a shutter that has an exposure time period greater than or equal to the light emission period of each of the LEDs, it would be possible to change the color temperature even with the values of the electrical currents that are supplied to each of the LEDs being the same, by changing the drive duty ratio for making each of the LEDs emit light. If it is possible to set the drive duty ratio for each of the LEDs individually, then it is possible to perform control so as to bring the ratios of the amounts of light from each LED, emitted at these drive duty ratios that have been set, to the desired light amount ratios over the entire exposure period during photography.

(6) In the embodiment described above, it was arranged to set the color temperatures of the illumination light during preliminary light emission by the illumination device 17 and of the illumination light during main light emission thereby automatically, by using the results of calculation of color temperature due to photography by the photometric sensor 16 (i.e. the second image sensor 102) that was installed in the camera main body 1. However, the following variant embodiment may also be considered. It is possible to provide the camera main body 1 with a manual setting mode in which the user is able to set the color temperatures of the illumination light during preliminary light emission by the illumination device 17 and of the illumination light during main light emission thereby manually to any desired color temperatures, and, during this manual setting mode, to control the illumination light, not to a color temperature that corresponds to the ambient light, but rather to the color temperature that the user has set manually. In this variant embodiment as well, both during the preliminary light emission and during the main light emission, the color temperatures are controlled to become the same as the color temperature that has been set manually. As the photometric sensor in the case of this variant embodiment, it is not necessary, as described above, to employ a photometric sensor that can measure the color temperature; it would also be acceptable to employ a photometric sensor that performs only luminance measurement. The features that the light of the preliminary light emission is measured using this photometric sensor, and that the amount of light to be emitted in the main light emission is obtained based upon this photometric result, are the same as in the embodiment described above. In the following, the operation of this variant embodiment will be explained using FIG. 3, only in terms of its points of difference.

The points of difference from the processing sequence shown in FIG. 3, are that in the step S202 only the luminance is calculated, that during the preliminary light emission in the step S205 the light is emitted at a color temperature that is set manually by the user, and that in the step S206 luminance measurement during the preliminary light emission is performed by a photometric sensor. The other steps are the same as those in FIG. 3. The photometric sensor could be provided to the camera main body, or to the illumination device.

According to this variant embodiment, and due also to the fact that both the color temperature during the preliminary light emission and also the color temperature during the main light emission are manually set to the same color temperature, it becomes unnecessary to give any consideration to the influence of discrepancies in the light reception sensitivities and the light emission characteristics of the photometric sensor 16 and the image sensor 9, so that it is possible to calculate an adequate amount of light for the main light emission in a simple manner. Moreover, by arranging for it to be possible manually to set the color temperature of the illumination light to any desired color temperature, the freedom of the user for image creation is enhanced. For example, it is possible to obtain a creative and moreover artistic image by causing illumination light that is sharply different from the ambient light to be emitted (for example, by causing the illumination device to emit reddish light (illumination light) under fluorescent lights that emit bluish light (ambient light)).

(7) Although, in the embodiment described above, it was arranged, as in FIG. 3, to perform the calculation of the exposure conditions in the step S207 or the step S212, it would also be acceptable to arrange to perform this calculation of the exposure conditions at a timing before the step S207 or the step S212, provided that it is after the photometry in the step S202. For example, it would be acceptable to arrange to perform this calculation of the exposure conditions during the interval from directly after the luminance has been calculated in the step S202, until the step S203.

(8) While, in the embodiment described above, it was arranged to transmit the color temperature information measured by the photometric sensor that was provided to the camera main body 1 from the camera main body 1 to the illumination device 17, it would also be acceptable to arrange to provide to the illumination device 17 another photometric sensor that is capable of measuring color temperature in a similar manner to this photometric sensor 16. In this case, along with the illumination control circuit 18 controlling the color temperatures during the preliminary light emission and during the main light emission based upon the results of calculating color temperature according to the photometry performed by this other photometric sensor within the illumination device 17, it also transmits this color temperature information to the microcomputer 10 within the camera main body 1, for the white balance processing that is to be performed by the microcomputer 10.

(9) While, in the embodiment described above, light from the same light emission unit was employed both as the illumination light during the preliminary light emission and also as the illumination light during the main light emission, it would also be acceptable to arrange to employ light from different light emission units.

The above described embodiments are examples, and various modifications can be made without departing from the scope of the invention.

And, a light emission control method that is executed by the camera and the camera system explained above when performing photography using illumination light emitted by an light emission unit, includes a step of controlling the color temperature of illumination light during a preliminary emission of light based upon color information for ambient light, and a step of controlling the amount of illumination light emitted during photography based upon the amount of light reflected back from the photographic subject during that preliminary light emission.

What is claimed is:

1. A camera, comprising:
a light emission device that can perform a main light emission lighting a photographic subject during photography of the photographic subject and can perform a preliminary light emission, before the main light emission, lighting the photographic subject for calculation of an amount of emitted light of the main light emission;
a color information calculation unit that calculates color information for ambient light;
a color temperature determination unit that determines a color temperature of illumination light of the preliminary light emission, based upon the color information calculated by the color information calculation unit;
a control unit that controls the light emission device to perform the preliminary light emission at the color temperature of the illumination light of the preliminary light emission determined by the color temperature determination unit; and
an amount of emitted light calculation unit that calculates the amount of emitted light of the main light emission using an amount of light reflected back from the photographic subject during the preliminary light emission, wherein:
the control unit controls the light emission device to perform the main light emission with the amount of emitted light calculated by the amount of emitted light calculation unit.

2. A camera according to claim 1, wherein:
the color temperature determination unit determines a color temperature of illumination light of the main light emission, based upon the color information calculated by the color information calculation unit; and
the control unit controls the light emission device to perform the main light emission at the color temperature of the illumination light of the main light emission determined by the color temperature determination unit.

3. A camera according to claim 1, wherein:
during a mode in which the color temperature of the illumination light is set manually, the control unit controls the color temperature of the illumination light of the preliminary light emission so as to match a manually set color temperature.

4. A camera according to claim 1, wherein:
the color temperature determination unit determines a color temperature of illumination light of the main light emission, based upon the color information calculated by the color information calculation unit; and
the control unit controls the light emission device to perform the main light emission at a color temperature not based upon the color temperature of the illumination light of the main light emission determined by the color temperature determination unit.

5. An illumination device, comprising:
a light emission device that can perform a main light emission lighting a photographic subject during photography of the photographic subject and that can perform a preliminary light emission, before the main light emission, lighting the photographic subject for calculation of an amount of emitted light of the main light emission;

a receiving unit that receives information of a color temperature of the main light emission and information of a color temperature of the preliminary light emission from a camera; and a control unit that controls the light emission device using the information of the color temperature of the main light emission and the information of the color temperature of the preliminary light emission received by the receiving unit.

6. An illumination device according to claim 5, wherein:
the control unit controls the color temperature of the preliminary light emission, so as to match the color temperature of the information of the color temperature of the preliminary light emission received by the receiving unit.

7. An illumination device according to claim 5, wherein:
the control unit controls the color temperature of the main light emission so as to match the color temperature of the preliminary light emission.

8. An illumination device according to claim 5, wherein:
during a mode in which the color temperature of illumination light is set manually, the control unit controls the color temperature of the illumination light of the preliminary light emission so as to match a manually set color temperature.

9. A controlling method for light emission, comprising:
calculating color information for ambient light;
determining a color temperature of illumination light of a preliminary light emission and a color temperature of an illumination light of a main light emission, based upon the color information calculated; and
calculating an amount of emitted light of the main light emission using amount of light reflected back from a photographic subject corresponding to the preliminary light emission; and
performing the main light emission with the amount of emitted light calculated.

* * * * *